Sept. 25, 1962 R. D. STANHOPE ET AL 3,055,788
METHOD OF BONDING HEAT-HARDENABLE BACKING MATERIALS
TO WOVEN LOW FRICTION MATERIALS
Filed March 21, 1958

INVENTORS.
Richard D. Stanhope
Lester A. Small
BY
Carnes, Dickey & Pierce
ATTORNEYS.

– Patented Sept. 25, 1962

3,055,788
METHOD OF BONDING HEAT-HARDENABLE BACKING MATERIALS TO WOVEN LOW FRICTION MATERIALS
Richard Darwin Stanhope, Bloomfield Hills, and Lester A. Small, Ferndale, Mich., assignors, by mesne assignments, to American Metal Products Company, a corporation of Michigan
Filed Mar. 21, 1958, Ser. No. 722,979
7 Claims. (Cl. 156—247)

This invention relates to a method for bonding backing materials to low friction materials and particularly to a method for bonding a hardenable backing material to a woven low friction material in a manner to prevent the flow of the backing material through to the face of the low friction material.

As illustrated in a copending application of Charles S. White, Serial No. 619,782, filed November 1, 1956, now abandoned, low friction resin materials formed into fibers and woven into cloth are extremely useful for providing bearing surfaces when a hardenable backing material is properly bonded thereto. However, a major problem in the use of such low friction materials lies in the fact that the hardenable backing material employed tends to flow through to the face of the woven low friction material to reduce the frictional characteristics of the low friction surface.

The main objects of the present invention are to provide a woven low friction material having a hardenable backing material bonded thereto in a manner to substantially eliminate the presence of backing material on the face of the low friction material; to provide a method for bonding a backing material to one side of a woven low friction material wherein a barrier layer of absorbent material is disposed over the other side of the low friction material to absorb any backing material flowing through the low friction material and then stripped from the low friction material to remove the backing material adhering thereto; and to produce laminates of woven low friction material and resin backing material which are inexpensive to manufacture, effective in use, and have substantially no resin backing material on the operating face of the low friction material.

Other objects and features of novelty of the invention will be specifically pointed out or otherwise become apparent when referring, for a better understanding of the invention, to the following description taken in conjunction with the accompanying drawing, wherein.

Figure 1:
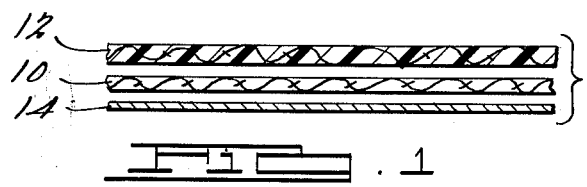
FIGURE 1 is an exploded sectional view of the material used for forming a laminate in accordance with the present invention.

Referring to FIG. 1, a laminate of the present invention is made up of a layer of low friction material 10, a backing material 12, and a barrier layer 14 of absorbent material. The low friction material can be any porous, woven or pervious low friction material to which it is desired to bond a backing material in a manner to avoid the adhesion of the backing material to the operative face of the low friction material. The barrier layer 14 of absorbent material can likewise be any absorbent material whatsoever which will effectively absorb any excess backing material 12 flowing through the low friction layer 10.

By way of example only, the layer of low friction material 10 may be polytetrafluoroethylene fibers woven into cloth form with bondable fibers interwoven therewith so that one face of the compound woven layer thus formed is composed predominantly of the polytetrafluoroethylene fibers and the other face predominantly of the bondable fibers. Such a material is completely described and claimed in a copending application of Charles S. White, Serial No. 544,945, filed on November 4, 1955, which issued as U.S. Patent No. 2,804,886 on September 3, 1957.

Further, by way of example only, the backing material 12 may be any hardenable material, such as one of the resin materials disclosed in the aforesaid copending applications which are phenol aldehyde resins including particularly phenol formaldehyde resins, urea-formaldehyde resins, polyester resins, elastomeric materials including natural and synthetic rubbers and the urethanes. Such resin materials will bond to the bondable fibers on the one face of the woven polytetrafluoroethylene. The barrier layer 14 may be any suitable absorbent paper, or the like.

Figure 2:
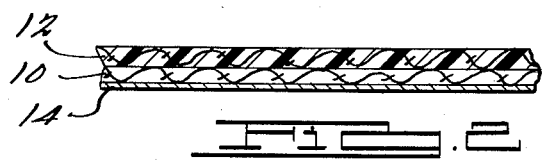
FIG. 2 is a sectional view of the material of FIG. 1 before heat and pressure are applied in accordance with the present invention.
Figure 3:
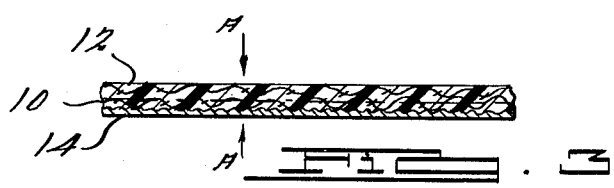
FIG. 3 is a sectional view of the material of FIG. 2 after heat and pressure have been applied.
Figure 4:
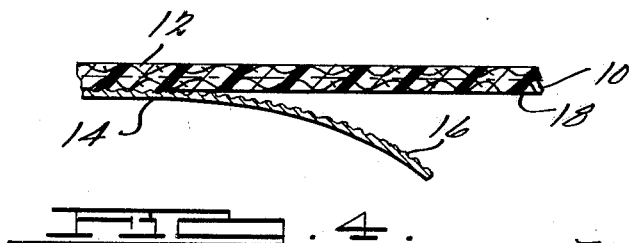
FIG. 4 is a sectional view of the material of FIG. 3 with the absorbent material partially stripped away.

As illustrated in FIG. 2, the layers are positioned together in intimate contact with one another and heat and pressure are simultaneously applied to the opposite faces of the layers as indicated by the arrows A of FIG. 3 to bond the hardenable backing material to the bondable fibers. Any backing material flowing through to the face of the woven layer of polytetrafluoroethylene is absorbed by the paper and, after the backing material hardens, the paper may be stripped from the surface of the woven polytetrafluoroethylene as illustrated in FIG. 4. The backing material adhering to surface 16 of the paper will be stripped off with the paper to leave surface 18 of the woven polytetrafluoroethylene substantially free of the backing material 12. The backing layer of the resultant laminate may then be bonded to a metal backing element to form a bearing, or the like. It is also within the purview of the invention to form the laminate of FIG. 2 about an element, such as a cylinder, and to apply the heat and pressure to form a bushing. The cylinder can then be removed and the barrier layer 14 stripped from the inner surface of the low friction material 10 to remove the backing material 12, as previously described. Reference is made to FIG 5 of the aforesaid copending application, Serial No. 619, 782, for an example of such a bushing formed by molding the backing layer about the low friction material.

If a thermosetting backing material is employed, the heat and pressure applied may be regulated to only partially cure the backing material and still enable the barrier layer 14 to be stripped off to remove the partially cured backing material adhering thereto. When the thermosetting backing material is thus only partially cured, the resulting laminate may, of course, be molded to any predetermined shape as it is described in the preceding paragraph to form a bearing insert. The partially cured insert with the barrier layer stripped therefrom may then be disposed between two elements adapted to receive it, and additional heat and pressure applied to bond or physically interlock the backing material to one of the elements, the backing material accurately conforming the low friction material to the other element after it is finally cured. It has been found that the partially cured backing material does not tend to flow through the low friction material when the resulting laminate is finally cured, since substantially all of the flow-through occurs before the laminate is partially cured.

With this procedure, heat and pressure can be applied to the laminate of FIG. 2 after it has been molded about an object, such as a portion of a ball, to partially cure the backing material. The ball can then be removed and the barrier layer 14 stripped away to form the bearing insert. Since the backing material is partially cured, it will retain its shape so that the insert can be mated with a similar ball and a housing clamped thereabout. Additional heat and pressure can then be applied to finally cure the backing material after it has accurately conformed the layer of low friction material to the surface of the ball.

From the above description, it is readily apparent that the present invention is applicable for use with any low friction material having a backing material that has a tendency to flow through the low friction material and thereby add friction to the low friction surface. Further, it is apparent that the invention is not limited to backing materials which are bonded to low friction material but also applies to those that are mechanically interlocked with the low friction material such as disclosed in the aforesaid application, Serial No. 619,782.

Still further, as above described, the invention also lends itself for use in situations wherein the backing and low friction layers are molded about elements of predetermined configuration, as well as when the backing material is applied to a flat layer of low friction material, as in FIGS. 1–4. Therefore, it is to be understood that while the embodiments of the invention herein disclosed are well calculated to fulfill the objects of the invention, the invention is susceptible to modification, variation and change without departing from the proper scope or fair meaning of the subjoined claims.

What is claimed is:

1. The method of securing a backing material to a layer of low friction material, including the steps of: positioning an absorbent material against one face of a layer of low friction porous material, securing a layer of backing material to the other face of the layer of low friction material through which the material of the backing layer may pass to said one face, and stripping the absorbent material from said one face of the layer of low friction material whereby the material flowing to said one face will be absorbed by said absorbent material and removed therewith.

2. The method of bonding a backing layer to a pervious layer of low friction material, including the steps of: positioning an absorbent material against one face of the pervious layer, positioning a bondable backing material against the other face of the pervious layer, applying heat and pressure to secure the backing material to the pervious layer, and stripping the absorbent material from said one face of the pervious layer which is substantially free of said bondable backing material which passed through said layer.

3. The method of bonding a hardenable backing layer to a layer of woven low friction material, including the steps of: positioning an absorbent layer against one face of a layer of woven low friction porous material, positioning a bondable backing layer against the other face thereof, applying heat and pressure to the layers to bond the backing layer to the low friction material through which some of the bondable layer will pass, and stripping the absorbent layer from the layer of low friction material along with the bondable layer which passes therethrough.

4. The method of bonding a hardenable backing material to a compound woven cloth having fibers of polytetrafluoroethylene resin material on one face thereof and bondable fibers on the other face thereof, including the steps of: positioning a layer of an absorbent material against the face of the woven cloth having the fibers of polytetrafluoroethylene resin material, positioning a backing material against the face of the woven cloth having the bondable fibers, applying heat and pressure to bond the backing material to the bondable fibers of the cloth through the weave of which some of the bondable material will pass, and stripping the layer of absorbent material from the fibers of polytetrafluoroethylene resin material to remove the absorbed backing material from the face thereof.

5. The method of bonding a thermosetting plastic backing material to a layer of low friction porous material, including the steps of: positioning an absorbent material against one face of the low friction porous material, positioning a bondable backing material against the other face of the low friction material, applying heat and pressure to partially cure and bond the backing material to the low friction porous material through which some of the backing material will pass, and stripping the absorbent material from the low friction material to remove the backing material absorbed thereby from said one face of the low friction porous material.

6. The method of bonding a thermosetting plastic backing material to a woven layer of low friction porous material, including the steps of, positioning a layer of absorbent material against one face of a layer of low friction woven porous material, positioning a backing material against the other face of the layer of low friction woven porous material, forming the layers to a planned shape, applying heat and pressure to partially cure and bond the backing material to the low friction material, stripping the layer of absorbent material from the low friction woven porous material to remove the backing material adhering thereto from said one face of said low friction porous material, and applying heat and pressure to finally cure the backing material after it has accurately conformed the low friction material to said planned shape.

7. A method of forming a bearing element, including the steps of, positioning an absorbent material against one face of a layer of low friction fabric material, positioning a thermosetting resin backing material against the other face of the low friction material, molding the materials to a planned shape to form a bearing insert, applying heat and pressure to partially cure and bond the backing material to the low friction material, and stripping the absorbent material from the low friction material to remove the backing material adhering thereto.

References Cited in the file of this patent

UNITED STATES PATENTS

| | | |
|---|---|---|
| 2,193,496 | Schwartz et al. | Mar. 12, 1940 |
| 2,408,245 | Walter | Sept. 24, 1946 |
| 2,773,781 | Rodman | Dec. 11, 1956 |
| 2,804,886 | White | Sept. 3, 1957 |
| 2,809,130 | Rappaport | Oct. 8, 1957 |
| 2,835,521 | White | May 20, 1958 |
| 2,842,473 | Oberly et al. | July 8, 1958 |
| 2,906,552 | White | Sept. 29, 1959 |
| 2,907,612 | White | Oct. 6, 1959 |